Figure 1:
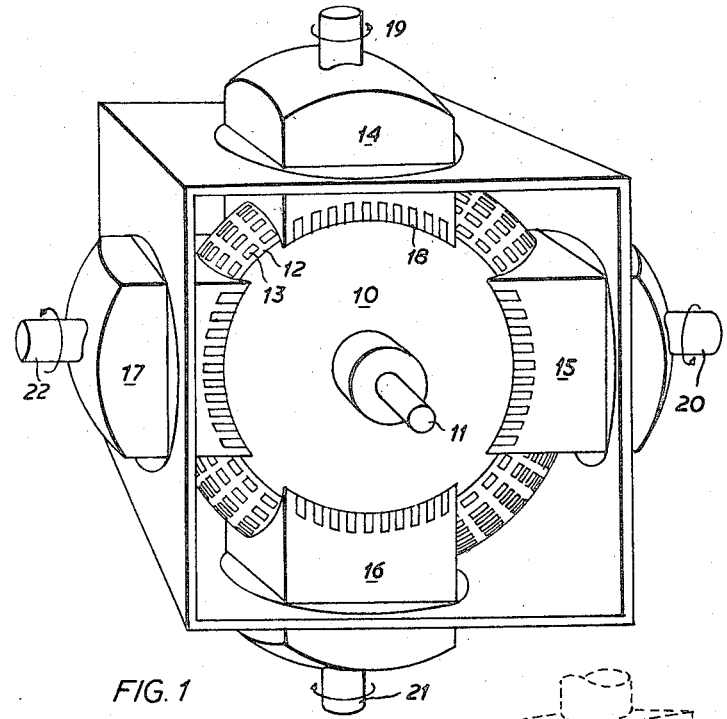

Aug. 19, 1958  F. C. WILLIAMS ET AL  2,848,675
INDUCTION MACHINES

Filed Nov. 29, 1956  4 Sheets-Sheet 1

INVENTORS
FREDERIC CALLAND WILLIAMS
ERIC ROBERTS LAITHWAITE
BY Stevens, Davis, Miller + Mosher
ATTORNEYS

INVENTORS
FREDERIC CALLAND WILLIAMS
ERIC ROBERTS LAITHWAITE
ATTORNEYS

Aug. 19, 1958     F. C. WILLIAMS ET AL     2,848,675
INDUCTION MACHINES

Filed Nov. 29, 1956     4 Sheets-Sheet 4

INVENTORS
FREDERIC CALLAND WILLIAMS
ERIC ROBERTS LAITHWAITE
BY
Stevens, Davis, Miller & Mosher
ATTORNEYS United States Patent Office 2,848,675
Patented Aug. 19, 1958

2,848,675

INDUCTION MACHINES

Frederic C. Williams, Romily, and Eric R. Laithwaite, Manchester, England, assignors to National Research Development Corporation, London, England Application November 29, 1956, Serial No. 625,175

Claims priority, application Great Britain December 1, 1955

11 Claims. (Cl. 318—243)

The present invention relates to alternating current machines and is more particularly concerned with machines of which the speed of operation is continuously variable.

Such a variable speed machine has been disclosed in United States application, Serial No. 476,446 and is of the type including a first member, which may be a rotor, having first paths of high electrical conductivity and second paths of high electrical conductivity intersecting said first paths, said first member being constrained to move in a predetermined path relative to a second member, which may be a stator, and electromagnetic means associated with said second member are arranged to produce effectively a moving magnetic field and are capable of angular rotation with respect to said first member in order to vary the direction of movement of the magnetic field relatively to the direction of movement of said first member.

One of the practical embodiments of the invention disclosed in the previously-mentioned specification consists of a machine in which the first member or rotor is in the form of part of a sphere of laminated iron in which a mesh of copper is embedded to form the first and second paths of high electrical conductivity. The second member or stator consists of two pairs of blocks each of which is provided with slots for accommodating the windings which give rise to the moving magnetic field. Each pair of blocks is arranged at opposite ends of a diameter of the rotor, the two diameters being at right angles, and each block has a concave face concentric with the rotor and can be rotated about an axis which is radial relative to the centre of the rotor and which is at right angles to the shaft carrying the rotor.

As described in the complete specification the motor is operated by energising the stator coils so that a moving magnetic field is produced to cause the rotation of the rotor, the speed of rotation being variable by varying the angle, between the direction of movement of the magnetic field and the direction of movement of the rotor.

The present invention is concerned with various improvements in a machine of the above type which provide a form which is a more attractive proposition from an economic point of view.

According to one feature of the invention, in an alternating current machine including a first member having first paths of high electrical conductivity and second paths of high electrical conductivity intersecting said first paths, said first member being constrained to move in a predetermined path relative to a second member and electromagnetic means associated with said second member are arranged to produce effectively a moving magnetic field and are capable of angular movement with respect to said first member in such a manner that at a given point on said first member the direction of movement of the magnetic field is variable relative to the direction of movement of said first member at said point to enable the velocity of movement of said first member to be varied, the electromagnetic means are so constructed that when the second member is mechanically midway between the limits of its angular movement, the angle between the direction of movement of the moving magnetic field at said point and the direction of movement of the first member at said point lies between 30 and 85 degrees.

According to another feature of the invention, in an alternating current machine including a rotor in the form of part of a sphere of laminated iron having a mesh of material of high electrical conductivity embedded therein and a stator consisting of two blocks arranged at opposite ends of a diameter of the rotor, each block having a concave face concentric with the rotor and being provided with slots for accommodating coils which give rise to a moving magnetic field while in order to enable the speed of rotation of the rotor to be varied both blocks are capable of angular movement about an axis which is radial relative to the centre of the rotor and which is at right angles to the rotor shaft, the stator coils are so arranged that when the stator is mechanically midway between the limits of its angular movement, the angle between the direction of movement of the magnetic field at a given point on said rotor and the direction of movement of said point on the rotor lies between 30 and 85 degrees.

According to a further feature of the invention, a method of constructing the stator of an alternating current machine having a rotor in the form of part of a sphere comprises the steps of supporting two rings in spaced relationship by two pairs of oppositely-positioned spacing members, inserting a plurality of similar laminations between corresponding spacing members of each pair, the edges of the laminations engaging with the edge of each of the said rings, laterally displacing the laminations with respect to each other to enable the apertures provided therein to form diagonally-extending parallel slots, severing the rings at points between each pair of spacing members to enable the two stator blocks so formed to be positioned to surround the rotor and re-uniting said rings.

Figure 5:
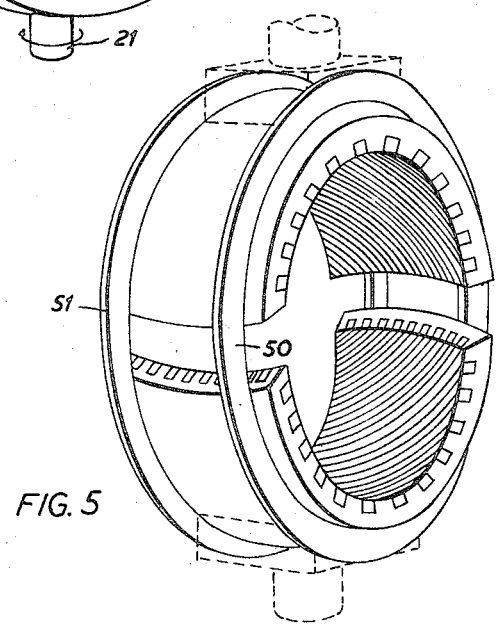
Figure 2A:
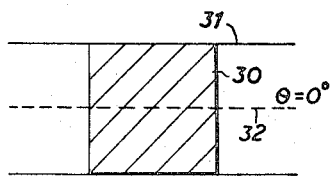
Figure 3A:
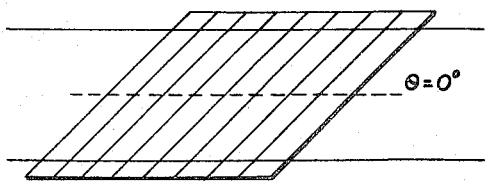
Figure 2B:
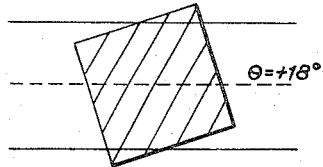
Figure 3B:
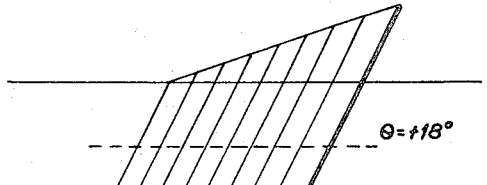
Figure 2C:
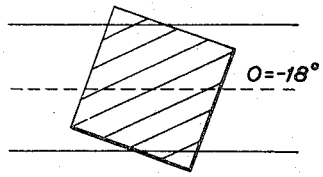
Figure 3C:
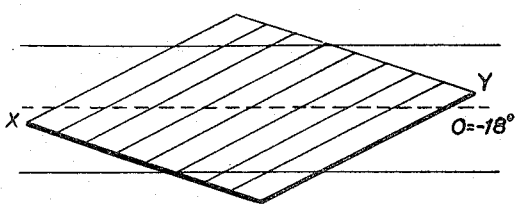
Figure 4:
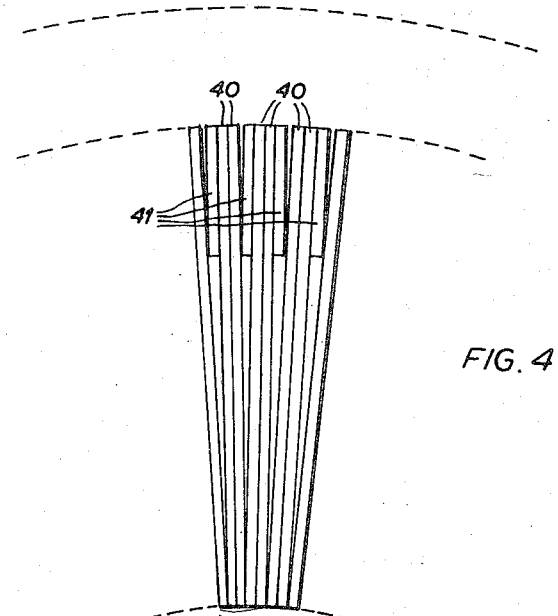
Figure 6:
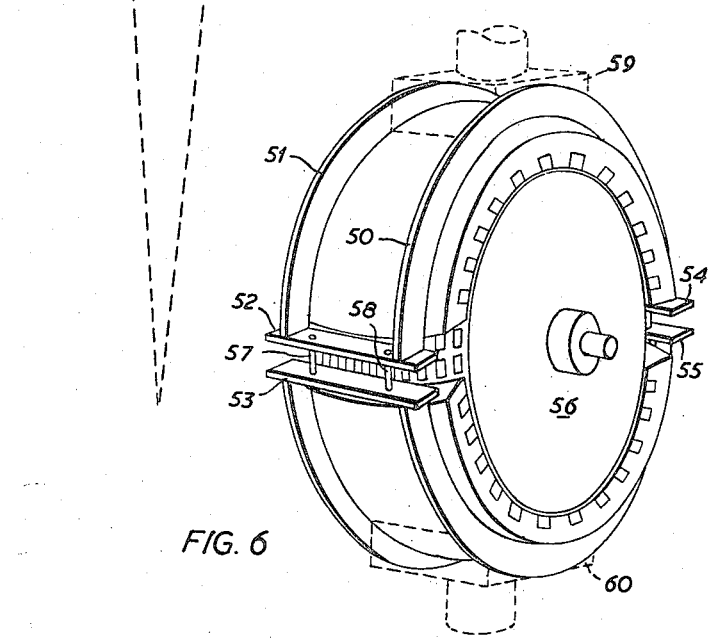
Figure 7:
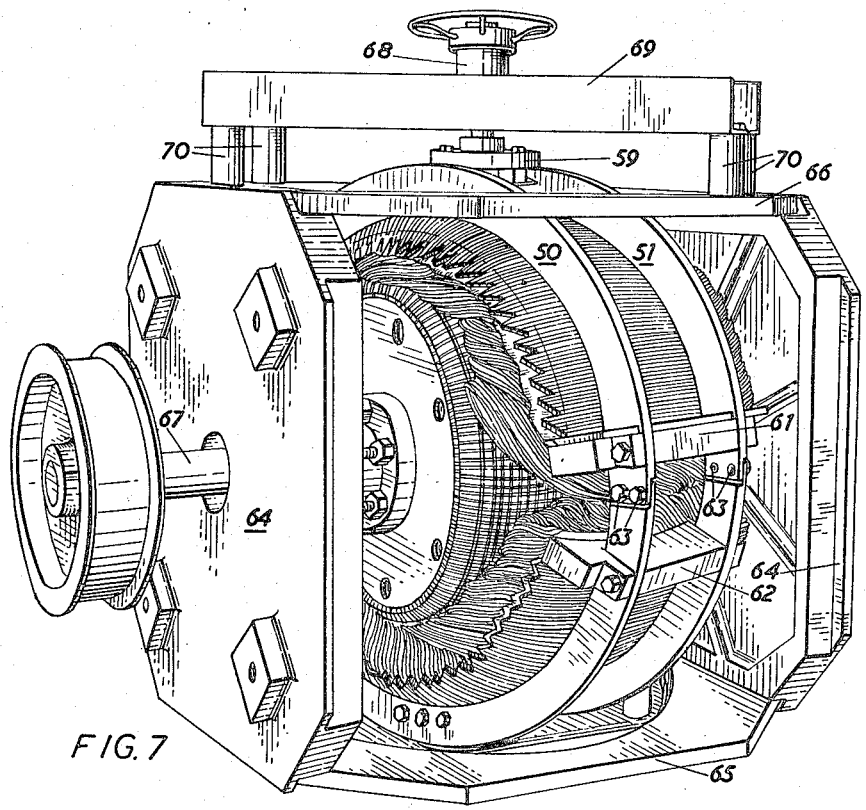

The invention will be better understood from the following description taken in conjunction with the accompanying drawings comprising Figs. 1 to 7. In the drawings:

Fig. 1 is a perspective view of the motor disclosed in the prior application referred to, Figs. 2A, 2B and 2C show diagrammatically the change in the number of stator poles influencing the rotor as the square stator block is rotated, Figs. 3A, 3B and 3C show diagrammatically the improvement obtained by using a stator block in the shape of a parallelogram rather than a square block, Fig. 4 shows the packing of the laminations to form a stator block, Fig. 5 shows one stage in the construction of the stator, Fig. 6 shows one form of completed stator, and Fig. 7 shows the assembled motor with a different form of stator.

It will be understood that the drawings are to some extent diagrammatic and in order to simplify the drawings the connections to the stator windings have not been shown except insofar as Fig. 7 is concerned and also the slots for the coils and the mesh embedded in the surface of the rotor have been somewhat enlarged.

One of the improvements introduced by the present invention relates to the constructional form of the motor. In the prior specification it was stated that the stator may comprise a plurality of pairs of blocks thus giving rise to a practical construction such as shown in Fig. 1 where as much of the surface of the rotor as possible is utilised. In Fig. 1 the rotor 10 is mounted on the shaft 11 and the two pairs of stator blocks 14, 16 and 15, 17 are positioned with their concave faces concentric with the rotor. Each pair is mounted at opposite ends of a diameter, the two diameters being at right angles to one another. The drawing also shows the copper mesh 12 surrounding projections 13 from the laminated core of the rotor. Each of the stator blocks is provided with slots such as 18 and is secured to a shaft such as 19 which is mounted for axial rotation as shown. The four shafts 19, 20, 21 and 22 are geared together for simultaneous rotation.

It was shown in the previously mentioned prior application that if $\mu_S$ is the velocity of the moving field due to the stator coils and $\theta$ is the angle between the direction of movement of the magnetic field and the direction of movement of the rotor, then the velocity $\mu$ of the rotor is given ideally by the expression $$\frac{\mu_s}{\cos \theta}$$

Now $$\frac{1}{\cos \theta}$$

changes from 1.0 to 1.14 as $\theta$ is varied from 0 deg. to 30 deg. while $$\frac{1}{\cos \theta}$$

changes from 1.14 to 2.0 as $\theta$ is varied from 30 deg. to 60 deg. and from 2 to 8 as $\theta$ is varied from 60 deg. to 85 deg. It will thus be seen that for equal changes in $\theta$, the change in rotor velocity is considerably greater in the 30 to 60 deg. range and in the 60 to 85 deg. range than in the 0 to 30 deg. range.

Hence if the stator poles are so arranged that in the normal position of the stator, the angle $\theta$ is 45 deg., then a ±18 deg. rotation of the stator with respect to the rotor will give substantially a 2:1 variation in rotor speed. Similarly a 4:1 speed ratio is obtainable by working in the 60 to 85 deg. range.

This arrangement of the stator poles has a number of advantages both electrical and mechanical, over the arrangement disclosed in the earlier specification. In the first place, due to the smaller angular rotation of the stator blocks, it is possible to use two blocks instead of the four square blocks as in the prior arrangement, each of the two blocks subtending an angle of substantially 150 deg. at the axis of the rotor.

In selecting the most advantageous shape for the two blocks, regard must be had to the fact that as far as possible the rotor in moving past a block should be influenced by the same number of stator poles whatever the value of $\theta$. Referring to Figs. 2A, 2B and 2C which show one square rotor block 30 in the mean position and in the two extreme positions respectively with respect to the rotor 31. Considering a point on the dotted centre line 32 of the rotor it will be seen that this desirable feature is not present. From geometrical considerations it will also be understood that the position is not greatly improved by the provision of a rectangular block, and it appears that the most favorable shape for the block is the parallelogram or diamond shape shown in Figs. 3A, 3B and 3C where the block is shown in the three position corresponding respectively to Figs. 2A, 2B and 2C. However even here the desired feature is only attained by constructing the block so that as shown in Fig. 3A the block overhangs the rotor. This is necessary in order for the number of poles passed by a point on the centre line of the rotor to be the same in the position shown in Fig. 3C as in the positions shown in Figs. 3A and 3B. It will also be appreciated that this desirable feature only applies along the centre line of the rotor but it is doubtful if this can be improved.

The shape of the block shown in Fig. 3 is a theoretical one which does involve some practical difficulties. As previously explained it is proposed to use two blocks and on grounds of efficiency it is desirable that these two blocks should embrace as much of the rotor as possible. From this point of view it will be understood that in view of Fig. 3C, the diamond shape is wasteful but a compromise may be accepted whereby the tips X and Y of the diamond may be somewhat flattened.

The use of a two-block stator also enables lighter block mountings to be used than was possible with the construction shown in Fig. 1. In the arrangement of Fig. 1, the stator mountings have to take the whole of the magnetic pull between the stator and the rotor and this involves the use of inconveniently heavy mountings. When using the two-block arrangement of the present invention, however, the two blocks may be formed as an integral part so that the stator bearings are called upon to withstand only the unbalance of the stator magnetic pull and lighter mountings can be used.

Another advantage of the arrangement of the stator coils in accordance with the invention arises from the following fact. The flux density in the airgap between any one stator block and the rotor increases in the direction of movement of the rotor. The magnetic flux entering the rotor gives rise to circulating currents in each rotor mesh and in general the current in any mesh will have a high value as the mesh passes from under the stator block. It is possible that the decay time of these circulating currents is such that they are still flowing when the mesh comes under the second stator block and the currents may adversely affect the operation of the second stator block.

However, with the construction according to the invention where two stator blocks are used, it will be understood that, if the stators are developed on one plane, the slots in one block will be at an angle to the slots in the other block. This must be so in order that the rotation of the two blocks causes either an increase or a decrease of $\theta$ to take place for both stator blocks. Due to this arrangement of the stator slots the effect of the rotor currents due to one block on the operation of the second block is very much reduced.

A further advantage, which is a mechanical one, arises from the fact that the slots in the stator for accommodating the windings giving rise to the magnetic field are at an angle to the direction of the movement of the rotor. In the prior construction where the slots extended at right angles to the direction of movement of the rotor, in order to use similar stampings when building the stator blocks, an accurate machining operation has to be performed on the inner surface of the blocks due to the fact that the radius of curvature was greater at the centre of the curved surface of the rotor than at the edges thereof. Since in the arrangement according to the invention the slots are at an angle to the direction of movement of the rotor, the stampings may be arranged in diametrical planes in building the blocks and hence the necessity for a machining operation is avoided.

A description will now be given with reference to Figs. 4, 5, 6 and 7 of two methods of construction of the stator according to the present invention. It will be understood that since each of the laminations forming a stator block is situated in a diametrical plane, adjacent laminations will make a small angle with one another as shown in Fig. 4 where the laminations are indicated at 40. In order to retain the laminations in position sections of annular rings 41 are interposed between the laminations or, as shown, between groups of laminations. In the construction of the stator blocks, two rings 50, 51 (Figs. 5, 6 and 7) are secured in suitable spaced relationship by spacing members of which two, 61 and 62, are shown in Fig. 7, the other two being at the rear of the motor. Laminations and annular rings are now inserted into the space between two of the spacing members e. g. 62 and the corresponding one at the rear of the motor, each lamination and annular ring resting on the two rings 50 and 51 in two knife edges. Since the laminations are all similar care must be exercised in the lateral positioning of the laminations in order that the slots formed thereby are at the correct angle. The second stator block is then formed in a similar manner, and the spaces between the laminations and the annular rings are filled with a suitable material to prevent vibration. The rings 50 and 51 are then cut between the spacing members 61 and 62 and between the spacing members at the rear of the machine to enable the two blocks so formed to be mounted to surround the rotor. The two blocks are then re-united, in one embodiment as shown in Fig. 6, by securing cross members 52, 53, 54 and 55 to the ends of the rings 50 and 51 and by providing thrust rods 57, 58 between the cross members. Alternatively as shown in Fig. 7 the rings may be cut in such a manner as to form rabbeted joints which enable the two blocks to be re-united by bolts 63. Suitably secured to the rings 50 and 51 are two diametrically opposite mountings 59 and 60 which are rotatably secured in the frame which carries the rotor. As shown in Fig. 7, the frame comprises the two side members 64 secured to top and bottom members 65 and 66 respectively, the rotor shaft 67 being carried in bearings in the two side members. The mounting 59 carries a vertical shaft 68 which passes through a bearing in the bridge 69 which is supported on the top plate by means of pillars 70. The position of the stator blocks relative to the rotor is then adjustable by rotation of the shaft 68.

We claim:

1. An alternating current machine comprising a first member of ferromagnetic material and having part of its surface of spherical shape, a second member having at least one part provided with a row of poles lying in a spherical surface concentric with the spherical surface of said first member, a source of alternating current, coils on said poles connected to said source to produce a magnetic field moving in a direction proceeding along the row of poles, means for enabling said second member to be rotated to a limited degree about an axis which passes through the common center of the spherical surface of said first member and the spherical surface on said second member, the row of poles being located on said second member so that when said second member is mechanically midway between the limits of its rotational movement, the angle between the direction of movement of the moving magnetic field at a point on said first member and the direction of movement of said point on said first member lies between 30 and 85 degrees and so that rotational movement of said second member gives rise to a change in said angle in the same sense for all parts of said second member, means for mounting the first member for rotation about an axis passing through said common center and a mesh of high electrical conductivity material embedded in the spherical surface of said first member, the mesh size being substantially less than the pitch of said poles.

2. An alternating current machine as claimed in claim 1 wherein the angle between the direction of movement of the magnetic field at said point and the direction of movement of the first member at said point lies between 30 and 60 degrees and is preferably 45 degrees to give a 2 to 1 speed ratio.

3. An alternating current machine as claimed is claim 1 wherein the angle between the direction of movement of the magnetic field at said point and the direction of movement of the first member at said point lies between 60 and 85 degrees to give a 4 to 1 speed ratio.

4. An alternating current machine as claimed in claim 1 wherein said second member which comprises the stator consists of two blocks arranged at opposite ends of a diameter of said first member which comprises the rotor, each block being provided with slots for accommodating said coils, the slots being arranged so that when the stator is in its midway position, the angle between a slot passing said point and the direction of movement of the rotor at said point lies between 15 and 60 degrees.

5. An alternating current machine as claimed in claim 4 in which said angle lies between 30 and 60 degrees and is preferably 45 degrees to give a 2 to 1 speed ratio.

6. An alternating current machine as claimed in claim 4 in which said angle lies between 15 and 30 degrees to give a 4 to 1 speed ratio.

7. An alternating current machine as claimed in claim 4 in which each stator block is in the shape of a parallelogram and the slots are parallel to two opposite sides of the parallelogram.

8. An alternating current machine as claimed in claim 7 in which the dimension of the parallelogram in the direction of the rotor axis is such that when the stator is mechanically midway between the limits of its angular rotation, the blocks overhang the rotor.

9. A method of constructing the stator of an alternating current machine having a rotor in the form of part of a sphere which comprises the steps of supporting two rings in spaced relationship by two pairs of oppositely-positioned spacing members, inserting a plurality of similar laminations between corresponding spacing members of each pair, the edges of the laminations engaging with the edge of each of the said rings, laterally displacing the laminations with respect to each other to enable the apertures provided therein to form diagonally-extending parallel slots, severing the rings at points between each pair of spacing members to enable the two stator blocks so formed to be positioned to surround the rotor and re-uniting said rings.

10. The method as claimed in claim 9 in which the two rings are severed by cutting in the form of a rabbet and are re-united by bolting the rabbeted joints.

11. The method as claimed in claim 9 in which the two rings are severed by a straight cut and bridge pieces are connected to each pair of ends of the two rings for each cut and the two stator blocks are re-united by thrust rods extending between opposed bridge pieces.

References Cited in the file of this patent

UNITED STATES PATENTS

| | | |
|---|---|---|
| 1,514,474 | Stewart | Nov. 4, 1924 |
| 1,559,920 | Stewart | Nov. 3, 1925 |
| 1,595,550 | Howard | Aug. 10, 1926 |
| 1,770,775 | Hall | July 15, 1930 |
| 2,047,831 | Lund | July 14, 1936 |
| 2,372,590 | Ljunggren et al. | Mar. 27, 1945 |